(12) United States Patent
Xu et al.

(10) Patent No.: US 12,501,452 B2
(45) Date of Patent: Dec. 16, 2025

(54) METHOD AND APPARATUS FOR RESOURCE ALLOCATION IN WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 394 days.

(21) Appl. No.: 18/016,772

(22) PCT Filed: Jul. 21, 2021

(86) PCT No.: PCT/KR2021/009411
§ 371 (c)(1),
(2) Date: Jan. 18, 2023

(87) PCT Pub. No.: WO2022/019646
PCT Pub. Date: Jan. 27, 2022

(65) Prior Publication Data
US 2023/0284244 A1    Sep. 7, 2023

(30) Foreign Application Priority Data
Jul. 24, 2020   (KR) .................. 10-2020-0092484

(51) Int. Cl.
*H04W 72/30* (2023.01)
*H04W 4/06* (2009.01)
*H04W 72/51* (2023.01)

(52) U.S. Cl.
CPC .......... *H04W 72/30* (2023.01); *H04W 72/51* (2023.01); *H04W 4/06* (2013.01)

(58) Field of Classification Search
CPC ..... H04W 72/23; H04W 72/30; H04W 72/51; H04W 4/06; H04W 76/27; H04W 88/08;
(Continued)

(56) References Cited

U.S. PATENT DOCUMENTS 7,986,633 B2    7/2011  Ryu et al.
2012/0207073 A1  8/2012  Kim et al.
(Continued)

OTHER PUBLICATIONS

3GPP, 3GPP TR 23.757 V0.4.0 (Jun. 2020), "3rd Generation Partnership Project; Technical Specification Group Services and System Aspects; Study on architectural enhancements for 5G multicast-broadcast services (Release 17)," Jun. 2020, 159 pages.
(Continued)

*Primary Examiner* — Mohamed A Kamara
(74) *Attorney, Agent, or Firm* — Fish & Richardson P.C.

(57) ABSTRACT

The present disclosure relates to resource allocation in wireless communications. According to various embodiments, a method performed by a central unit (CU) in a wireless communication system comprises: receiving, from one or more distributed units (DUs), resource information on radio resources for a multicast-broadcast service (MBS) service allocated by the one or more DUs; determining to perform a multicast or broadcast transmission of the MBS service to wireless devices based on a location of the wireless devices and a number of the wireless devices; determining common resources for the multicast or broadcast transmission of the MBS service to be used by the one or more DUs based on the resource information received from the one or more of DUs; and transmitting, to the one or more DUs, information for the common resources for the multicast or broadcast transmission of the MBS service.

15 Claims, 11 Drawing Sheets

(58) Field of Classification Search
CPC ... H04W 88/085; H04W 76/40; H04W 28/16; H04W 72/541; H04W 76/11
See application file for complete search history.

(56) References Cited

U.S. PATENT DOCUMENTS

| | | | |
|---|---|---|---|
| 2019/0116533 A1 | 4/2019 | Lee et al. | |
| 2019/0166526 A1* | 5/2019 | Xu | H04W 92/20 |
| 2019/0387444 A1 | 12/2019 | Byun et al. | |
| 2021/0105837 A1* | 4/2021 | Lee | H04W 68/00 |
| 2021/0219106 A1* | 7/2021 | Li | H04W 60/04 |
| 2022/0278788 A1* | 9/2022 | Pedersen | H04L 5/0035 |
| 2022/0322291 A1* | 10/2022 | Wang | H04W 76/10 |
| 2023/0112613 A1* | 4/2023 | Mehta | H04L 41/0631 370/216 |
| 2023/0262734 A1* | 8/2023 | Qi | H04L 12/189 455/414.1 |

OTHER PUBLICATIONS

3GPP, 3GPP TS 23.468 V16.0.0 (Jul. 2020), "3rd Generation Partnership Project; Technical Specification Group Services and System Aspects; Group Communication System Enablers for LTE (GCSE LTE); Stage 2 (Release 16)," Jul. 2020, 34 pages.

3GPP, 3GPP TS 38.401 V16.2.0 (Jul. 2020), "3rd Generation Partnership Project; Technical Specification Group Radio Access Network; NG-RAN; Architecture description (Release 16)," Jul. 2020, 79 pages.

3GPP, 3GPP TS 38.463 V16.1.1 (Apr. 2020), "3rd Generation Partnership Project; Technical Specification Group Radio Access Network; NG-RAN; E1 Application Protocol (E1AP) (Release 16)," Apr. 2020, 191 pages.

3GPP, 3GPP TS 38.473 V16.1.0 (Mar. 2020), "3rd Generation Partnership Project; Technical Specification Group Radio Access Network; NG-RAN; F1 application protocol (F1AP) (Release 16)," Mar. 2020, 240 pages.

International Search Report International Appln. No. PCT/KR2021/009411, mailed Oct. 22, 2021, 2 pages.

3GPP, "3rd Generation Partnership Project; Technical Specification Group Services and System Aspects; Release 15 Description; Summary of Rel-15 Work Items (Release 15)," 3GPP TR 21.915 V0.4.0, Oct. 2018, 106 pages.

Huawei, HiSilicon, "MBS Session Management," S2-2000489, SA WG2 Meeting #136AH, Incheon, South Korea, Jan. 13-17, 2020, 4 pages.

Office Action in Korean Appln. No. 10-2022-7046228, mailed on Apr. 15, 2025, 21 pages (with English translation).

* cited by examiner

METHOD AND APPARATUS FOR RESOURCE ALLOCATION IN WIRELESS COMMUNICATION SYSTEM

CROSS-REFERENCE TO RELATED APPLICATIONS

This application is a National Stage application under 35 U.S.C. § 371 of International Application No. PCT/KR2021/009411, filed on Jul. 21, 2021, which claims the benefit of Korean Patent Application No. 10-2020-0092484, filed on Jul. 24, 2020. The disclosures of the prior applications are incorporated by reference in their entirety.

TECHNICAL FIELD

The present disclosure relates to resource allocation in wireless communications.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Multicast-broadcast service (MBS) service can be provided in wireless communication systems, including a wireless communication system adopting a central unit (CU)-distributed unit (DU) split radio access network (RAN). In the CU-DU split RAN, resource allocation method may be an issue for providing the MBS service.

DISCLOSURE OF INVENTION

Technical Problem

An aspect of the present disclosure is to provide method and apparatus for resource allocation in a wireless communication system.

Another aspect of the present disclosure is to provide method and apparatus for resource allocation for MBS service in a wireless communication system.

Another aspect of the present disclosure is to provide method and apparatus for resource allocation for MBS service in CU-DU split RAN in a wireless communication system.

Another aspect of the present disclosure is to provide method and apparatus for receiving a multicast or broadcast transmission of the MBS service in a wireless communication system.

Solution to Problem

According to various embodiments, a method performed by a central unit (CU) in a wireless communication system comprises: receiving, from one or more distributed units (DUs), resource information on radio resources for a multicast-broadcast service (MBS) service allocated by the one or more DUs; determining to perform a multicast or broadcast transmission of the MBS service to wireless devices based on a location of the wireless devices and a number of the wireless devices; determining common resources for the multicast or broadcast transmission of the MBS service to be used by the one or more DUs based on the resource information received from the one or more of DUs; and transmitting, to the one or more DUs, information for the common resources for the multicast or broadcast transmission of the MBS service.

According to various embodiments, a central unit (CU) in a wireless communication system comprises: a transceiver; a memory; and at least one processor operatively coupled to the transceiver and the memory, and configured to: control the transceiver to receive, from one or more distributed units (DUs), resource information on radio resources for a multicast-broadcast service (MBS) service allocated by the one or more DUs; determine to perform a multicast or broadcast transmission of the MBS service to wireless devices based on a location of the wireless devices and a number of the wireless devices; determine common resources for the multicast or broadcast transmission of the MBS service to be used by the one or more DUs based on the resource information received from the one or more of DUs; and control the transceiver to transmit, to the one or more DUs, information for the common resources for the multicast or broadcast transmission of the MBS service.

According to various embodiments, a processor for a wireless device in a wireless communication system is configured to control the wireless device to perform operations comprising: receiving, from one or more distributed units (DUs), resource information on radio resources for a multicast-broadcast service (MBS) service allocated by the one or more DUs; determining to perform a multicast or broadcast transmission of the MBS service to wireless devices based on a location of the wireless devices and a number of the wireless devices; determining common resources for the multicast or broadcast transmission of the MBS service to be used by the one or more DUs based on the resource information received from the one or more of DUs; and transmitting, to the one or more DUs, information for the common resources for the multicast or broadcast transmission of the MBS service.

According to various embodiments, a computer-readable medium has recorded thereon a program for performing each step of a method on a computer, the method comprising: receiving, from one or more distributed units (DUs), resource information on radio resources for a multicast-broadcast service (MBS) service allocated by the one or more DUs; determining to perform a multicast or broadcast transmission of the MBS service to wireless devices based on a location of the wireless devices and a number of the wireless devices; determining common resources for the multicast or broadcast transmission of the MBS service to be used by the one or more DUs based on the resource information received from the one or more of DUs; and transmitting, to the one or more DUs, information for the common resources for the multicast or broadcast transmission of the MBS service.

According to various embodiments, a method performed by a wireless device in a wireless communication system comprises: identifying common resources for a multicast or broadcast transmission of a multicast-broadcast service (MBS) service, wherein the common resources comprise resources that are common among radio resources for the MBS service allocated by one or more distributed units (DUs); and receiving, from the one or more DUs, the multicast or broadcast transmission of the MBS service through the common resources, wherein it is determined to perform the multicast or broadcast transmission of the MBS service is determined based on a location of wireless devices and a number of the wireless devices, wherein the wireless devices comprise at least one of: wireless devices that are in a radio resource control (RRC) connected mode; wireless devices that have joined the MBS service; or wireless devices that are in cells covered by the one or more DUs.

According to various embodiments, a wireless device in a wireless communication system comprises: a transceiver; a memory; and at least one processor operatively coupled to the transceiver and the memory, and configured to: identify common resources for a multicast or broadcast transmission of a multicast-broadcast service (MBS) service, wherein the common resources comprise resources that are common among radio resources for the MBS service allocated by one or more distributed units (DUs); and control the transceiver to receive, from the one or more DUs, the multicast or broadcast transmission of the MBS service through the common resources, wherein it is determined to perform the multicast or broadcast transmission of the MBS service is determined based on a location of wireless devices and a number of the wireless devices, wherein the wireless devices comprise at least one of: wireless devices that are in a radio resource control (RRC) connected mode; wireless devices that have joined the MBS service; or wireless devices that are in cells covered by the one or more DUs.

Advantageous Effects of Invention

The present disclosure may have various advantageous effects.

For example, CU can coordinate resources for MBS service which covers multiple DUs so that multicast or broadcast transmission of the MBS service can avoid interferences with other on-going sessions.

For another example, DU may determine the resources for the MBS service by itself. DU may determine the resources for the MBS service by itself if one DU is involved for the MBS service.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

MODE FOR THE INVENTION

Figure 1:
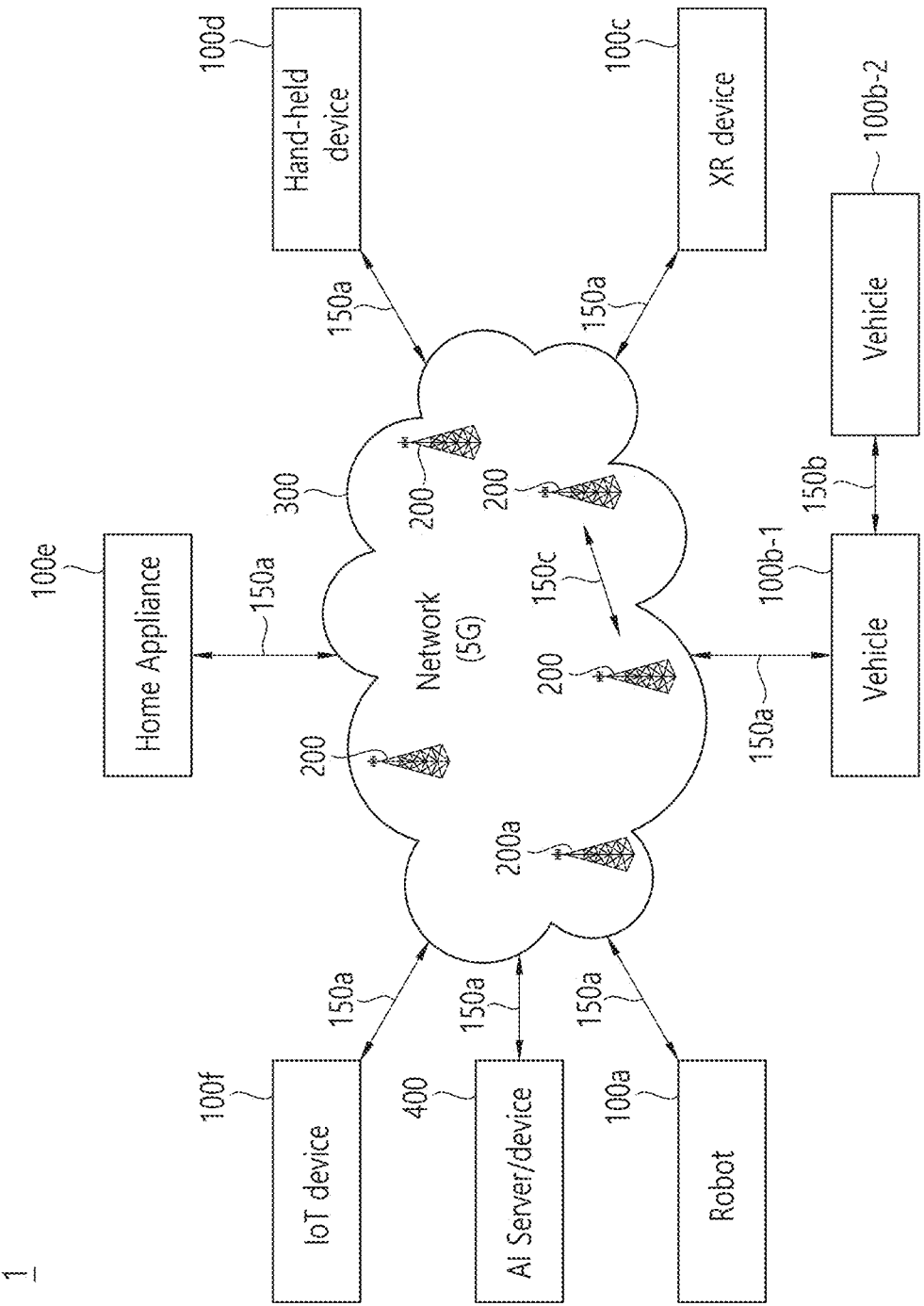
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using EUTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a selfdriving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
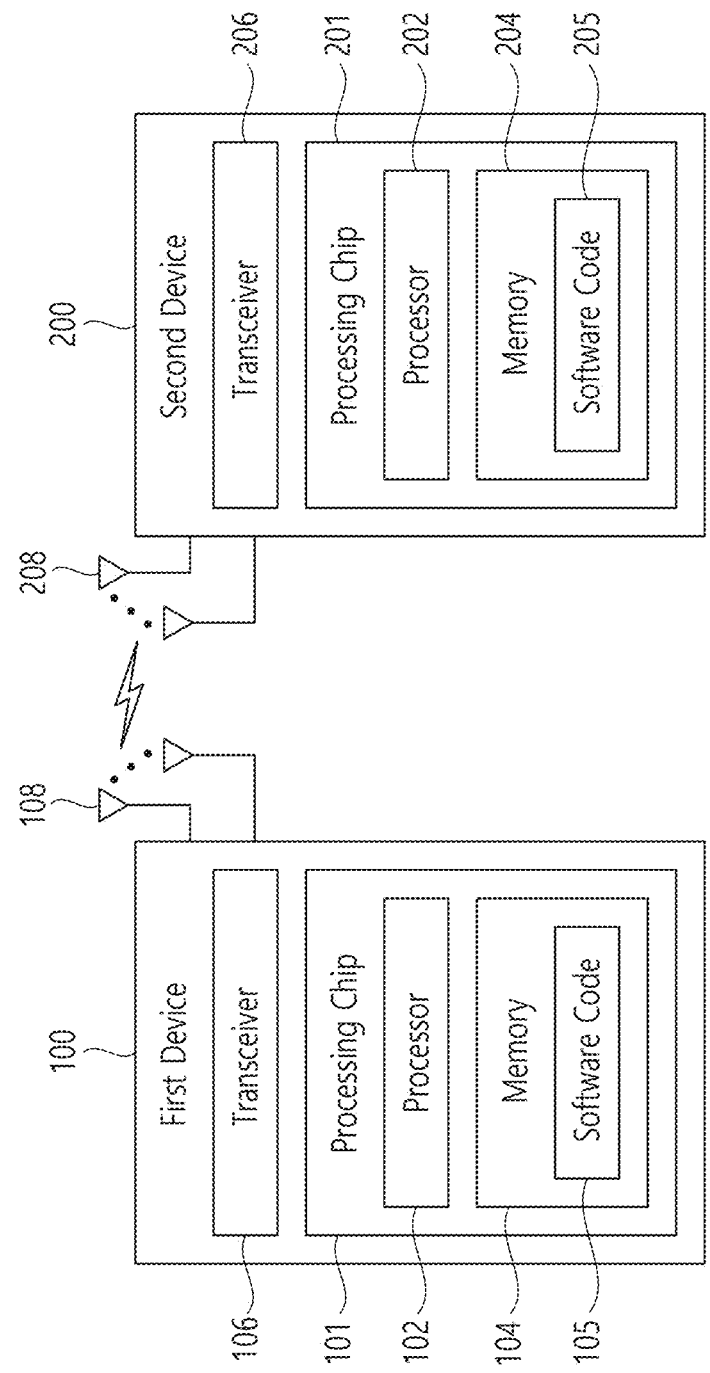
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE nonbandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
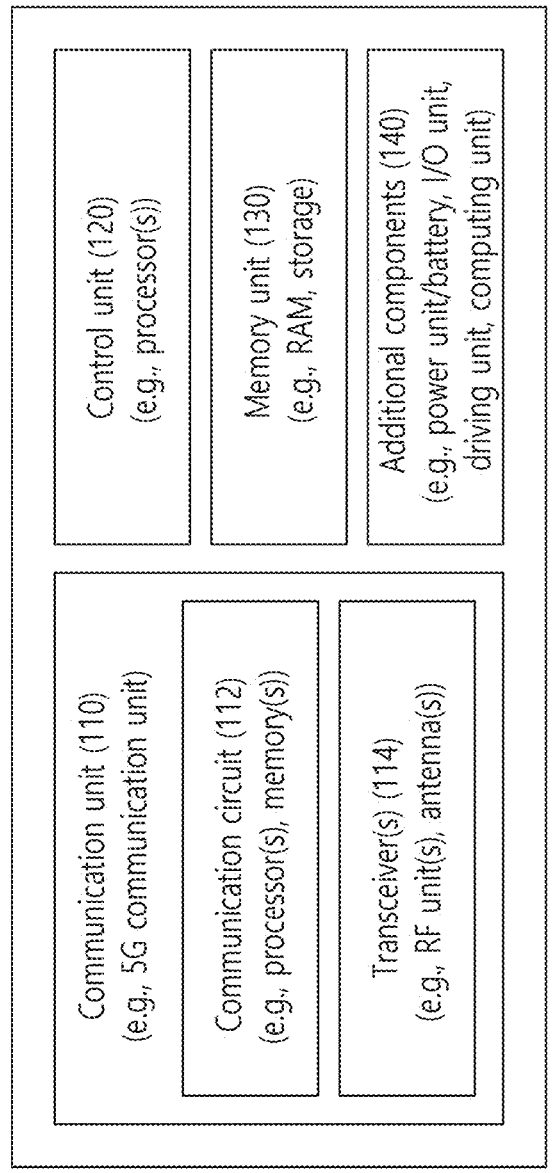
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
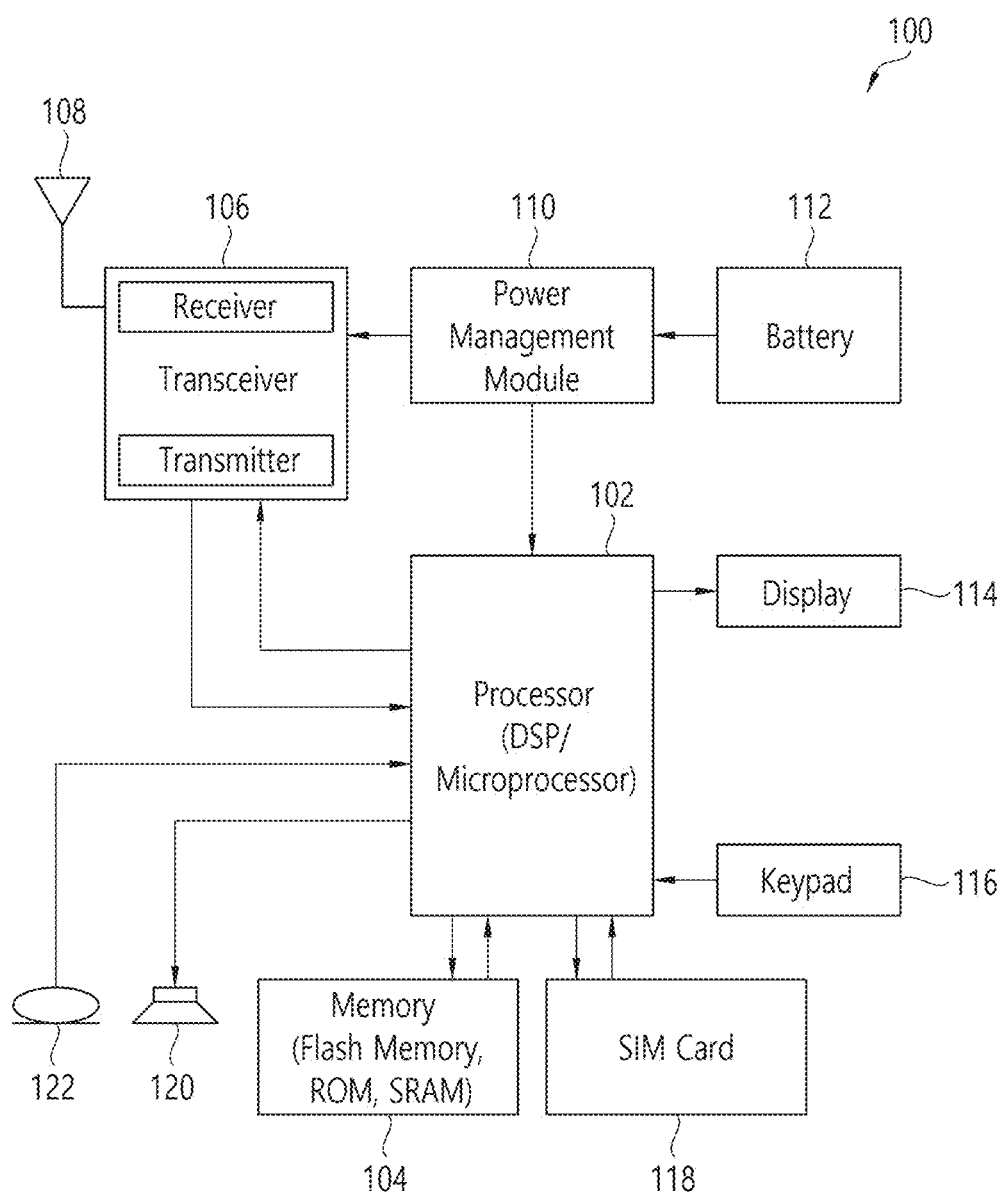
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm©, EXYNOS™ series of processors made by Samsung©, A series of processors made by Apple©, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
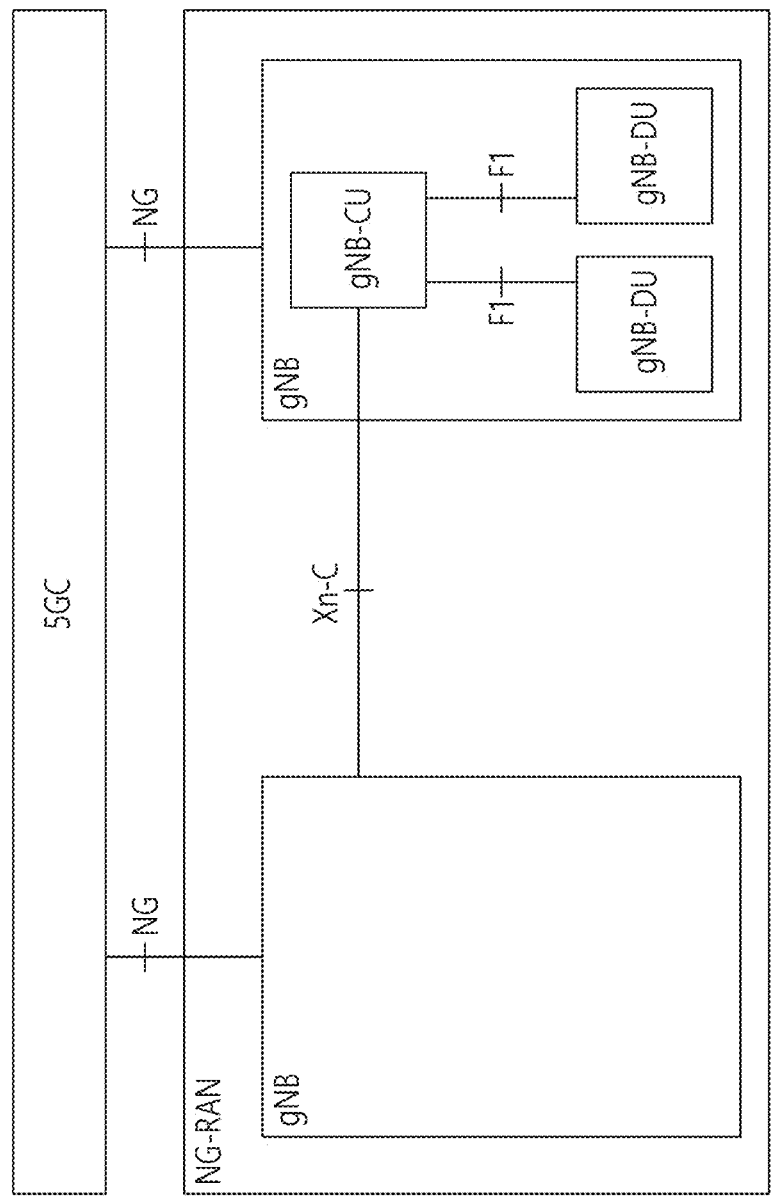
FIG. 5 shows an example of the overall architecture of an NG-RAN to which technical features of the present disclosure can be applied.

FIG. 5 shows an example of the overall architecture of an NG-RAN to which technical features of the present disclosure can be applied.

Referring to FIG. 5, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNBCU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 6:
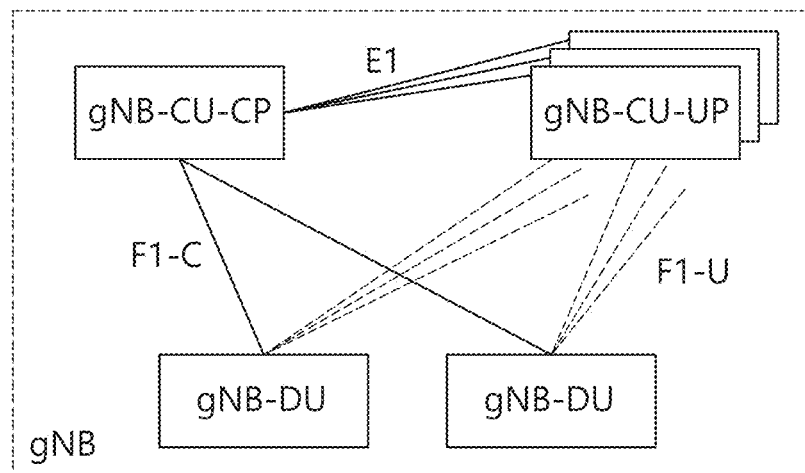
FIG. 6 shows an example of overall architecture for separation of gNB-CU-control plane (gNB-CU-CP) and gNB-CU-user plane (gNB-CU-UP) to which technical features of the present disclosure can be applied.

FIG. 6 shows an example of overall architecture for separation of gNB-CU-control plane (gNB-CU-CP) and gNB-CU-user plane (gNB-CU-UP) to which technical features of the present disclosure can be applied.

Referring to FIG. 6, a gNB may include a gNB-CU-CP, multiple gNB-CU-UPs and multiple gNB-DUs. A gNB-CU-CP may be simply referred to as CU-CP and a gNBCU-UP may be simply referred to as CU-UP. The gNB-CU-CP and the gNB-CU-UP may be included in gNB-CU.

The gNB-CU-CP may be a logical node hosting an RRC and a control plane part of a PDCP protocol of the gNB-CU for a gNB. As illustrated, the gNB-CU-CP is connected to the gNB-DU through F1-C interface. The gNB-CU-CP terminates an E1 interface connected with the gNB-CU-UP and the F1-C interface connected with the gNB-DU.

The gNB-CU-UP may be a logical node hosting a user plane part of the PDCP protocol of the gNB-CU for a gNB, and the user plane part of the PDCP protocol and a SDAP protocol of the gNB-CU for a gNB. As illustrated, the gNB-CU-UP is connected to the gNB-DU through F1-U interface, and is connected to the gNBCU-CP through the E1 interface. The gNB-CU-UP terminates the E1 interface connected with the gNB-Cu-CP and the F1-U interface connected with the gNB-DU.

According to an illustration shown in FIG. 6, the following properties may hold:

(1) A gNB-DU may be connected to a gNB-CU-CP.

(2) A gNB-CU-UP may be connected to a gNB-CU-CP.

(3) A gNB-DU can be connected to multiple gNB-CU-UPs under the control of the same gNB-CU-CP (i.e., the gNB-CU-CP to which the gNB-DU is connected and the multiple gNB-CU-UPs are connected).

(4) A gNB-CU-UP can be connected to multiple DUs under the control of the same gNB-CU-CP (i.e., the gNB-CU-CP to which the gNB-CU-UP is connected and the multiple DUs are connected).

Hereinafter, multicast-broadcast service (MBS) is described.

MBS is a point-to-multipoint communication scheme where data packets are transmitted simultaneously from a single source (e.g., base station and/or DU) to multiple destinations (e.g., UEs). The term 'broadcast' may refer to transmitting contents to all UEs, whereas the term 'multicast' may refer to transmitting contents related to a service to a specific group of UEs that are subscribed to the service. The MBS is different from a unicast service where data packets are transmitted from a single source to a single destination. The multicast and broadcast content may be transmitted over a geographical area, referred to as 'MBS area'. An MBS area may comprise one or more base stations (or, one or more DUs) transmitting the same content. Each base station capable of MBS service may belong to one or more MBS areas. Each MBS area may be identified by an MBS identifier (ID). The MBS ID may comprise at least one of a temporary mobile group identifier (TMGI) or a multicast address.

A UE can receive the MBS content within the MBS area in a connected state (e.g., RRC connected mode) or idle state (e.g., RRC idle mode). A base station may provide MBS service corresponding to different MBS areas.

A bearer for transferring MBS data may be referred to as MBS bearer or MBS radio bearer (MRB). An ID related to the MRB may be referred to as MRB ID, and a quality of service (QoS) related to the MRB may be referred to as MRB QoS.

In MBS scheme, there may be a multicast/broadcast single-frequency network (MBSFN) transmission in which identical signals may be transmitted from multiple cells with identical coding and modulation and with timing and frequency synchronized across the multiple cells. Physical multicast channel (PMCH) may be used for the MBSFN transmission. The PMCH may also contain MBS traffic and/or control information.

Meanwhile, MBS service may be supported in 5G architecture. RAN basic functions for broadcast/multicast for UEs in RRC_CONNECTED state may be specified. For example, how to perform radio resource allocation in case of CU/DU split case may be an issue to solve.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 7:
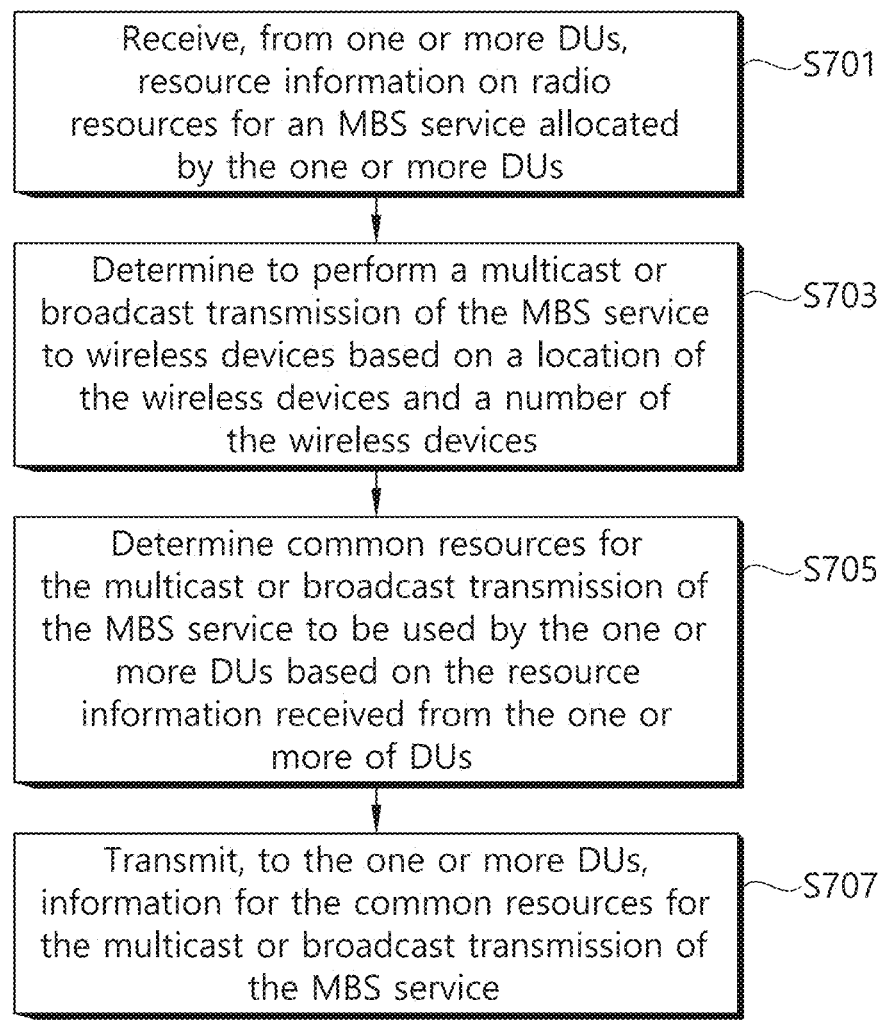
FIG. 7 shows an example of a method for a resource allocation by CU for MBS service according to an embodiment of the present disclosure.

FIG. 7 shows an example of a method for a resource allocation by CU for MBS service according to an embodiment of the present disclosure. Steps illustrated in FIG. 7 may be performed by a CU, especially, CU-CP.

Referring to FIG. 7, in step S701, the CU may receive, from one or more DUs, resource information on radio resources for a multicast-broadcast service (MBS) service allocated by the one or more DUs.

In step S703, the CU may determine to perform a multicast or broadcast transmission of the MBS service to wireless devices based on a location of the wireless devices and a number of the wireless devices. In another case, the CU may determine to perform a unicast transmission of the MBS service to wireless devices based on a location of the wireless devices and a number of the wireless devices. That is, the CU may determine whether to perform a MBS transmission of the MBS service or a unicast transmission of the MBS service to wireless devices based on a location of the wireless devices and a number of the wireless devices.

In step S705, the CU may determine common resources for the multicast or broadcast transmission of the MBS service to be used by the one or more DUs based on the resource information received from the one or more of DUs. The common resources may comprise resources that are common among the radio resources for the MBS service allocated by the one or more DUs.

In step S707, the CU may transmit, to the one or more DUs, information for the common resources for the multicast or broadcast transmission of the MBS service.

The common resources may be determined/selected so that the multicast or broadcast transmission does not interfere with sessions that are on-going in DUs other than the one or more DUs.

The CU may transmit, to the one or more DUs, a message for requesting the resource information on radio resources for MBS service allocated by the one or more DUs. The resource information may be received in response to the message.

The wireless devices may comprise at least one of: wireless devices that are in a radio resource control (RRC) connected mode; wireless devices that have joined the MBS service; or wireless devices that are in cells covered by the one or more DUs.

The CU may receive, from at least one of a core network (CN), an application server or the wireless devices, information for the location of the wireless devices. The CU may receive, from at least one of a CN, an application server or the wireless devices, information for the number of the wireless devices.

The CU may receive, from an AMF, a request message for a setup of a MBS bearer session resource. The CU may determine to perform the multicast or broadcast transmission of the MBS service comprises determining to perform the multicast or broadcast transmission of the MBS service upon receiving the request message.

The common resources may comprise at least one of: a MRB ID related to the MBS service; an MRB QoS related to the MBS service; a PMCH configuration including at least one of allocated subframes, modulation and condign scheme (MCS) or multicast channel (MCH) scheduling period; a logical channel ID; a MBSFN subframe configuration including at least one of a radio frame allocation period, a radio frame allocation offset or a subframe allocation; a command subframe period; or an MBS area ID related to the MBS service.

The CU may comprise CU-CP. The CU-CP may transmit, to a CU-UP, a bearer setup request message for requesting an establishment of an MBS bearer for the multicast or broadcast transmission. The CU-CP may receive, from the CU-UP, a bearer setup response message after the MBS bearer is established between the CU-UP and the one or more DUs. The CU-CP may transmit, to the one or more DUs, the information for the common resources upon receiving the bearer setup response message.

The CU may receive, from the one or more DUs, a response message for the information for the common resources. The response message may comprise at least one of a DL TEID or an MBS ID.

Figure 8:
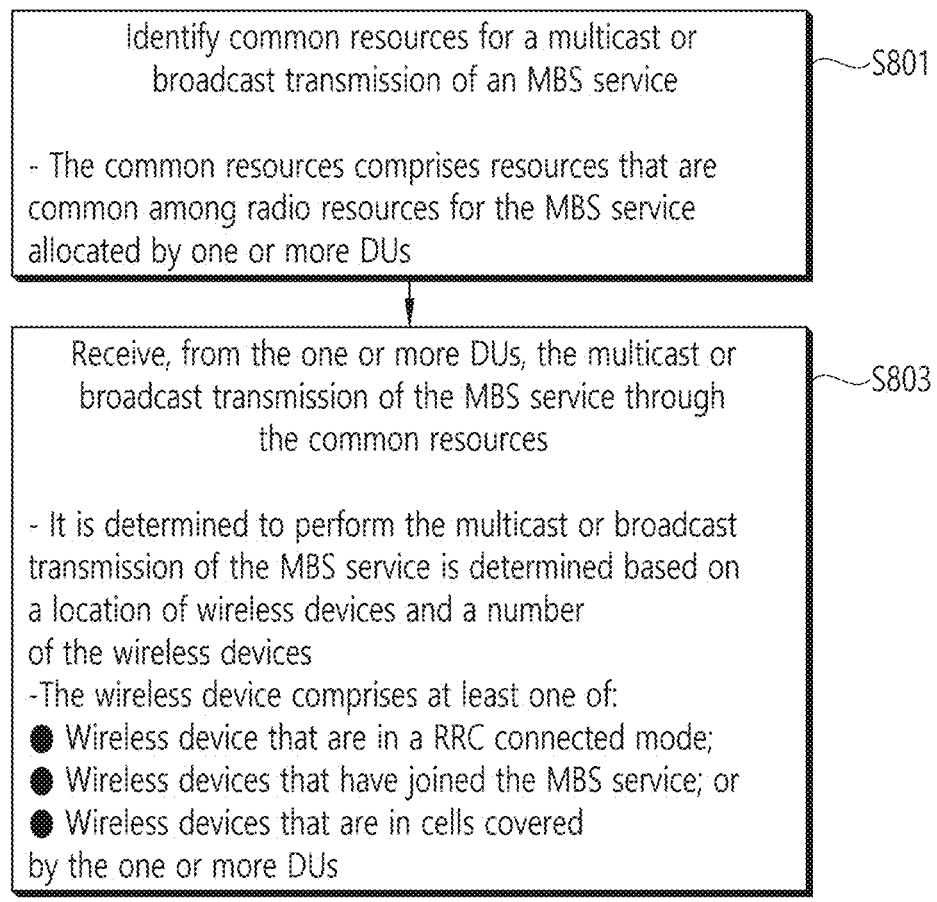
FIG. 8 shows an example of a method for receiving an MBS transmission according to an embodiment of the present disclosure.

FIG. 8 shows an example of a method for receiving an MBS transmission according to an embodiment of the present disclosure. Steps illustrated in FIG. 8 may be performed by a wireless device and/or a UE.

Referring to FIG. 8, in step S801, the wireless device may identify common resources for a multicast or broadcast transmission of a MBS service. The common resources may comprise resources that are common among radio resources for the MBS service allocated by one or more DUs.

In step S803, the wireless device may receive, from the one or more DUs, the multicast or broadcast transmission of the MBS service through the common resources. It may be determined to perform the multicast or broadcast transmission of the MBS service is determined based on a location of wireless devices and a number of the wireless devices. The wireless devices may comprise at least one of: wireless devices that are in a radio resource control (RRC) connected mode; wireless devices that have joined the MBS service; or wireless devices that are in cells covered by the one or more DUs.

Hereinafter, examples of solutions for solving resource allocation problems, which may involve one or more DUs, may be described in conjunction with FIGS. 9 to 11.

Figure 9:
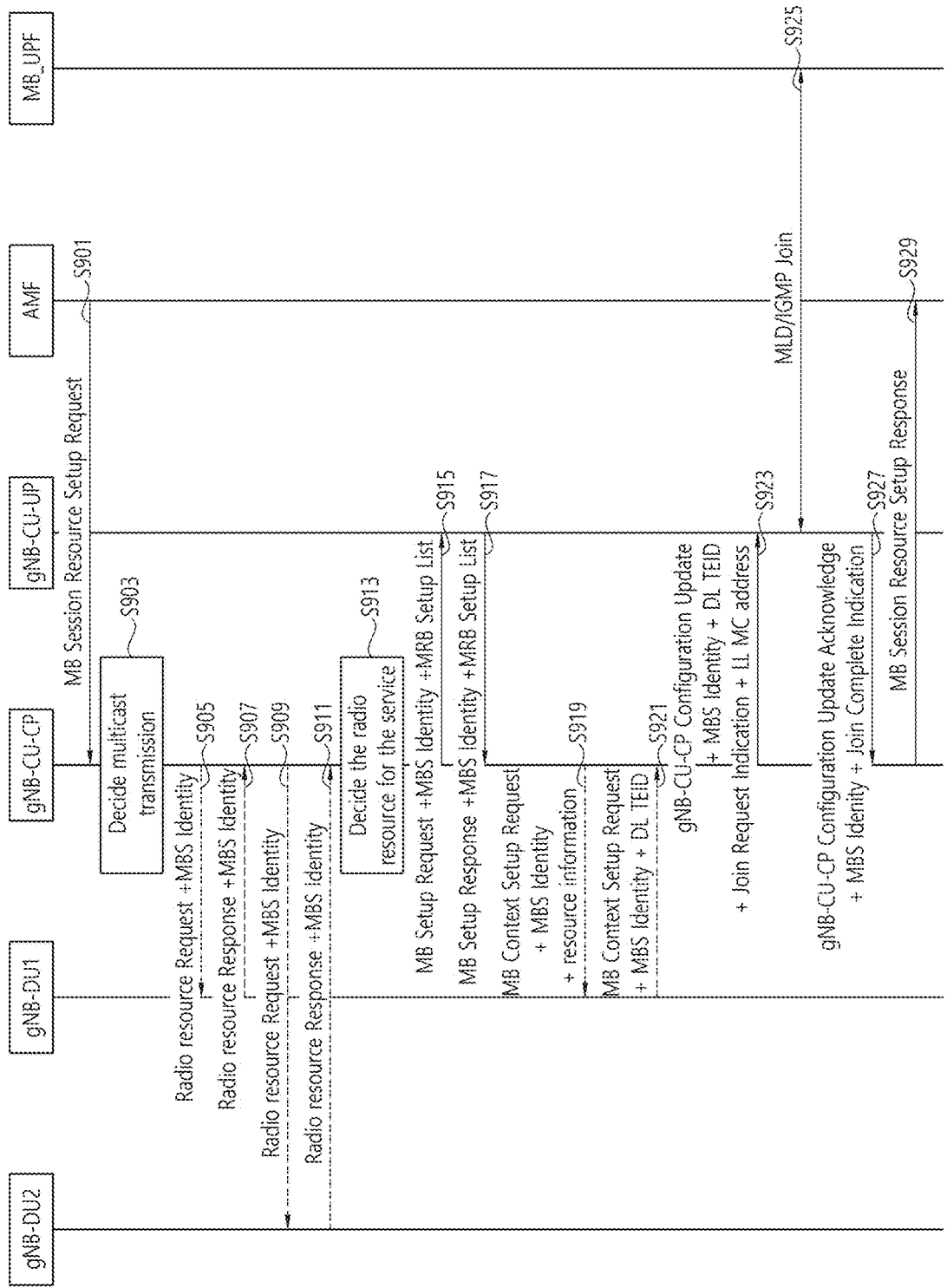
FIG. 9 shows a first example of a resource allocation procedure for MBs according to an embodiment of the present disclosure.

FIG. 9 shows a first example of a resource allocation procedure for MBs according to an embodiment of the present disclosure.

Referring to FIG. 9, in step S901, the AMF may send an MBS bearer (MB) session resource setup request message or new message including at least one of an MBS identity (e.g., TMGI and/or low layer multicast (LL MC) address), or 5G authorized QoS profile to the gNB-CU-CP where CM CONNECTED UEs that have joined the TMGI resides.

In step S903, on receiving the MB session resource setup request message from the AMF, the gNB-CU-CP may create an MB session context for the received MBS Identity. Based on the number of RRC_CONNECTED UEs and the location of UEs, the gNB-CU-CP may decide to perform multicast transmission for indicated MBS, which may covers one or more DUs. The UEs may comprise UEs that have joined the MBS service, and/or UEs that are in cells covered by the one or more DUs. The gNBCU-CP may receive information for the location of UEs from at least one of a CN, an application server or the UEs. The gNB-CU-CP may receive information for the number of UEs that are RRC_CONNECTED from at least one of a CN, an application server or the UEs.

In step S905 and step S909, based on the decision above, the CU-CP may send a radio resource request message (i.e., a message for requesting resource information on radio resources for MBS service allocated by the one or more DUs) to the corresponding DUs (one or more). The MBS ID (e.g., TMGI), Multicast Radio Bearer (MRB) ID and/or MRB QoS can be included in the radio resource request message.

In step S907 and S911, when the one or more DUs received the radio resource request message from the CU-CP, the one or more DUs may allocate the corresponding radio resources for this MBS service. Then, the one or more DUs may transmit, to the CU-CP, a radio resource response message comprising resource information on the radio resources for MBS service allocated by the one or more DUs.

In step S913, when the radio resource response messages are received from the one or more DUs, the CU-CP may decide common resources to be used for multiple DUs including the one or more DUs based on the received resource information from each DU. The common resources may comprise resources that are common among the radio resources for the MBS service allocated by the one or more DUs. The CU-CP may adjust a little bit to select the common resources and also to avoid interferences with other on-going sessions in other DUs.

For example, if only one DU is involved, the CU-CP may adopt the radio resources allocated by that DU, or the CU-CP may adjust a little bit to avoid interferences with other on-going sessions in other DUs.

For example, the CU-CP may decide the followings:
Multicast Radio Bearer (MRB) ID, MRB QoS;
PMCH configuration including allocated subframes, modulation and coding scheme, MCH scheduling period;
Logical channel ID;
MBSFN subframe configuration including radio frame allocation period, radio frame allocation offset, subframe allocation;
common subframe period; and/or
MBS area ID.

The above decided information may be included in the common resources.

In step S915, the gNB-CU-CP may send a Bearer Context Modification Request message, MB setup request message or new message to the gNB-CU-UP to request establishing the MBS bearer for multicast/broadcast data transmission between the gNBCU-UP and the gNB-DU. The bearer context modification request message or the MB setup request message may include the MBS Identity to indicate MBS to which the requested MBS bearer is related.

In step S917, upon a receipt of the bearer context modification request message or the MB setup request message, the gNB-CU-UP may establish the requested bearer for indicated MBS and transmit a Bearer Context Modification Response message, MB setup response message or new message to the gNB-CU-CP.

In step S919, on receiving the bearer context modification request message or the MB setup request message from the gNB-CU-UP, the gNB-CU-CP may send the UE Context Setup/Modification Request message, MB context setup request message or new MBS message to the gNB-DU in order to send information for the decided radio resources (i.e., common resources) for the MBS service. The following information may be included in the UE Context Setup/Modification Request message or the MB context setup request message:
Multicast Radio Bearer (MRB) ID, MRB QoS;
PMCH configuration including allocated subframes, modulation and coding scheme, MCH scheduling period;
Logical channel ID;
MBSFN subframe configuration including radio frame allocation period, radio frame allocation offset, subframe allocation;
common subframe period; and/or
MBS area ID.

In step S921, when the gNB-DU received the information for the common resources, the gNB-DU may use the common resources as indicated and transmit a UE Context Setup/Modification Response message, the MB context setup response message or new message including a DL TEID and/or MBS ID to the gNB-CU-CP.

In step S923, upon the receipt of the UE Context Setup/Modification Response message or the MB context setup response message from the gNB-DU, the gNBCU-CP may transmit a Bearer Context Modification Request message, gNB-CU-CP configuration update message or new message to the gNB-CU-UP. The Bearer Context Modification Request message or the gNB-CU-CP configuration update message may contain the MBS Identity to indicate MBS to which the requested bearer is related. The Bearer Context Modification Request message or the gNB-CU-CP configuration update message may include the Join Request Indication and/or the LL MC address so that the gNB-CU-UP can join the multicast group for indicated MBS.

In step S925, on receiving the Bearer Context Modification Request message or the gNB-CU-CP configuration update message from the gNB-CU-CP, the gNB-CU-UP may perform a multicast listener discover (MLD)/internet group management protocol (IGMP) Join for the MBS indicated by the MBS Identity along with a MB-UPF. If the gNB-CU-UP receives multiple Bearer Context Modification Request messages including the Join Request Indication and/or the LL MC address, the gNB-CU-UP may perform the MLD/IGMP Join once.

In step S927, the gNB-CU-UP may respond with a Bearer Context Modification Response message, gNB-CU-CP configuration update acknowledge (ACK) message or new message. The Bearer Context Modification Response message or gNB-CU-CP configuration update ACK message may include the Join Complete Indication to inform the gNB-CU-CP that joining the multicast group for the MBS is completed.

In step S929, when the Bearer Context Modification Response message or gNBCU-CP configuration update ACK message is received from the gNB-CU-UP, the gNB-CU-CP may transmit a DL RRC Message Transfer message with the RRCReconfiguration to the gNB-DU in order to provide the UE with the information related to bearer established for the MBS.

Figure 10:
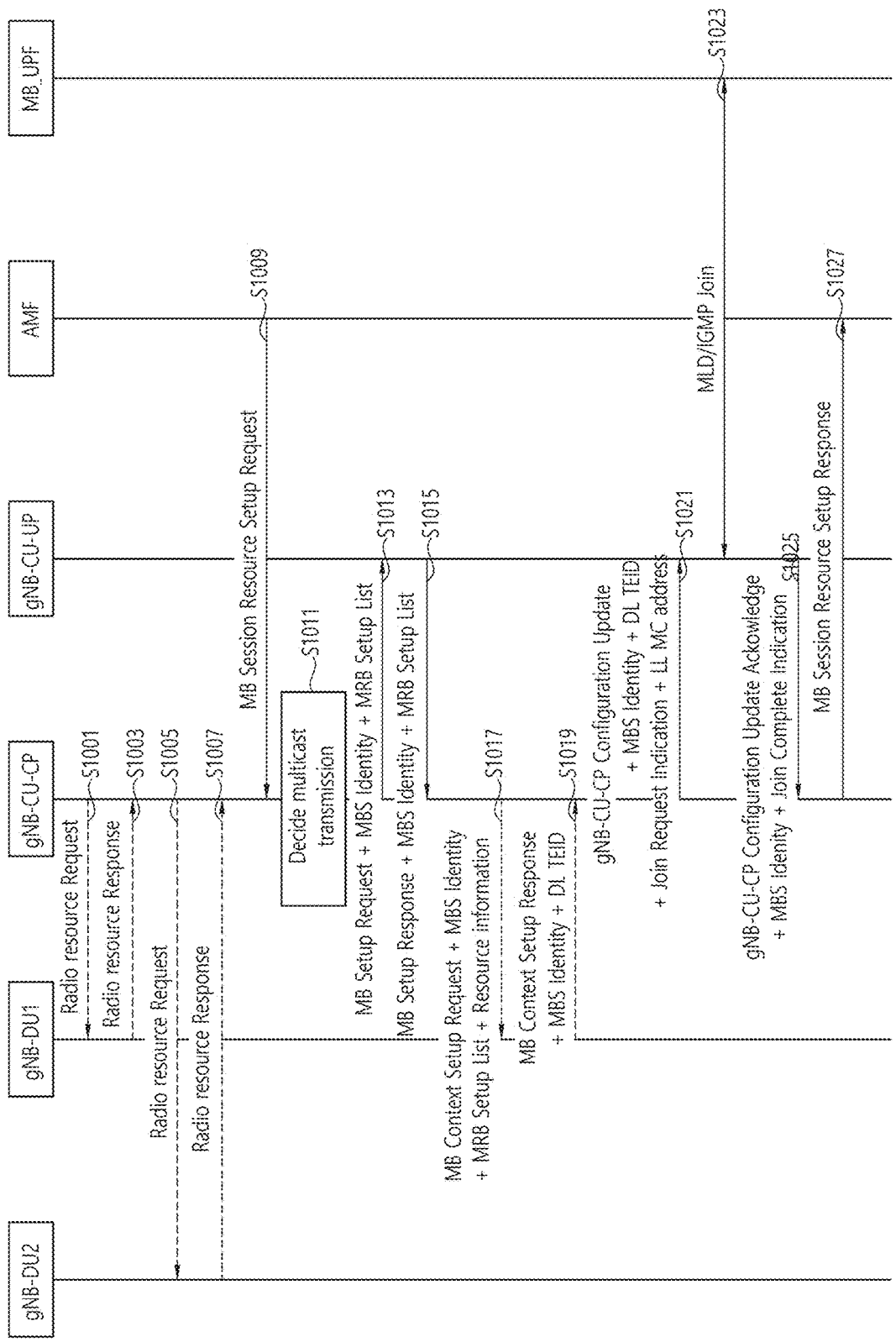
FIG. 10 shows a second example of a resource allocation procedure for MBs according to an embodiment of the present disclosure.

FIG. 10 shows a second example of a resource allocation procedure for MBs according to an embodiment of the present disclosure. In FIG. 10, resource information for determining common resources for multicast or broadcast transmission of MBS service may be received from the one or more DUs beforehand. If CU supports an MBS service, the MBS service may cover multiple DUs. The CU may get resources in advance, either by requesting to DU or receiving from the DU directly without the request Referring to FIG. 10, in step S1001 and S1005, CU-CP may trigger a radio resource request message to the corresponding DUs (one or more). Cell specific procedure may be used.

In step S1003 and S1007, when the one or more DUs received the radio resource request message from the CU-CP, the one or more DUs may allocate radio resources for candidate MBS services in the future. The radio resources may comprise high level resources, such as big pool or resource pool. Then, the one or more DUs may transmit, to the CU-CP, a radio resource response message comprising resource information on the radio resources for MBS service allocated by the one or more DUs.

In step S1009, the AMF may send a MB Session Resource Setup Request message or new message including an MBS Identity (e.g., TMGI), low layer multicast (LL MC) address, and/or 5G Authorized QoS Profile to the gNB-CU-CP where CM CONNECTED UEs that has joined the TMGI resides.

In step S1011, on receiving the MB Session Resource Setup Request message from the AMF, based on the number of UEs that are in RRC_CONNECTED and the location of UEs, the gNB-CU-CP may decide to perform multicast or broadcast transmission for indicated MBS, which may cover one or more DUs. The UEs may comprise UEs that have joined the MBS service, and/or UEs that are in cells covered by the one or more DUs. The gNB-CU-CP may receive information for the location of UEs from at least one of a CN, an application server or the UEs. The gNB-CU-CP may receive information for the number of UEs that are RRC_CONNECTED from at least one of a CN, an application server or the UEs.

Based on the received resource information from the one or more UEs, the CU-CP may decide common resources to be used for multiple DUs including the one or more DUs. The common resources may comprise resources that are common among the radio resources for the MBS service allocated by the one or more DUs. The CU-CP may adjust to select the common resources and/or to avoid interferences with on-going session in DUs other than the one or more DUs.

For example, if only one DU is involved, the CU-CP may adopt the radio resources allocated by that DU, or the CU-CP may adjust a little bit to avoid interferences with other on-going sessions in other DUs.

For example, the CU-CP may decide the followings:
Multicast Radio Bearer (MRB) ID, MRB QoS;
PMCH configuration including allocated subframes, modulation and coding scheme, MCH scheduling period;
Logical channel ID;
MBSFN subframe configuration including radio frame allocation period, radio frame allocation offset, subframe allocation;
common subframe period; and/or
MBS area ID.

The above decided information may be included in the common resources.

In step S1013, the gNB-CU-CP may send a Bearer Context Modification Request message, MB setup request message or new message to the gNB-CU-UP to request establishing the MBS bearer for multicast/broadcast data transmission between the gNBCU-UP and the gNB-DU. The bearer context modification request message or the MB setup request message may include the MBS Identity to indicate MBS to which the requested MBS bearer is related.

In step S1015, upon a receipt of the bearer context modification request message or the MB setup request message, the gNB-CU-UP may establish the requested bearer for indicated MBS and transmit a Bearer Context Modification Response message, MB setup response message or new message to the gNB-CU-CP.

In step S1017, on receiving the bearer context modification request message or the MB setup request message from the gNB-CU-UP, the gNB-CU-CP may send the UE Context Setup/Modification Request message, MB context setup request message or new MBS message to the gNB-DU in order to send information for the decided radio resources (i.e., common resources) for the MBS service. The following information may be included in the UE Context Setup/Modification Request message or the MB context setup request message:

Multicast Radio Bearer (MRB) ID, MRB QoS;
PMCH configuration including allocated subframes, modulation and coding scheme, MCH scheduling period;
Logical channel ID;
MBSFN subframe configuration including radio frame allocation period, radio frame allocation offset, subframe allocation;
common subframe period; and/or
MBS area ID.

In step S1019, when the gNB-DU received the information for the common resources, the gNB-DU may use the common resources as indicated and transmit a UE Context Setup/Modification Response message, the MB context setup response message or new message including a DL TEID and/or MBS ID to the gNB-CU-CP.

In step S1021, upon the receipt of the UE Context Setup/Modification Response message or the MB context setup response message from the gNB-DU, the gNBCU-CP may transmit a Bearer Context Modification Request message, gNB-CU-CP configuration update message or new message to the gNB-CU-UP. The Bearer Context Modification Request message or the gNB-CU-CP configuration update message may contain the MBS Identity to indicate MBS to which the requested bearer is related. The Bearer Context Modification Request message or the gNB-CU-CP configuration update message may include the Join Request Indication and/or the LL MC address so that the gNB-CU-UP can join the multicast group for indicated MBS.

In step S1023, on receiving the Bearer Context Modification Request message or the gNB-CU-CP configuration update message from the gNB-CU-CP, the gNB-CU-UP may perform a multicast listener discover (MLD)/internet group management protocol (IGMP) Join for the MBS indicated by the MBS Identity along with a MB-UPF. If the gNB-CU-UP receives multiple Bearer Context Modification Request messages including the Join Request Indication and/or the LL MC address, the gNB-CU-UP may perform the MLD/IGMP Join once.

In step S1025, the gNB-CU-UP may respond with a Bearer Context Modification Response message, gNB-CU-CP configuration update acknowledge (ACK) message or new message. The Bearer Context Modification Response message or gNB-CU-CP configuration update ACK message may include the Join Complete Indication to inform the gNB-CU-CP that joining the multicast group for the MBS is completed.

In step S1027, when the Bearer Context Modification Response message or gNBCU-CP configuration update ACK message is received from the gNB-CU-UP, the gNB-CU-CP may transmit a DL RRC Message Transfer message with the RRCReconfiguration to the gNB-DU in order to provide the UE with the information related to bearer established for the MBS.

Figure 11:
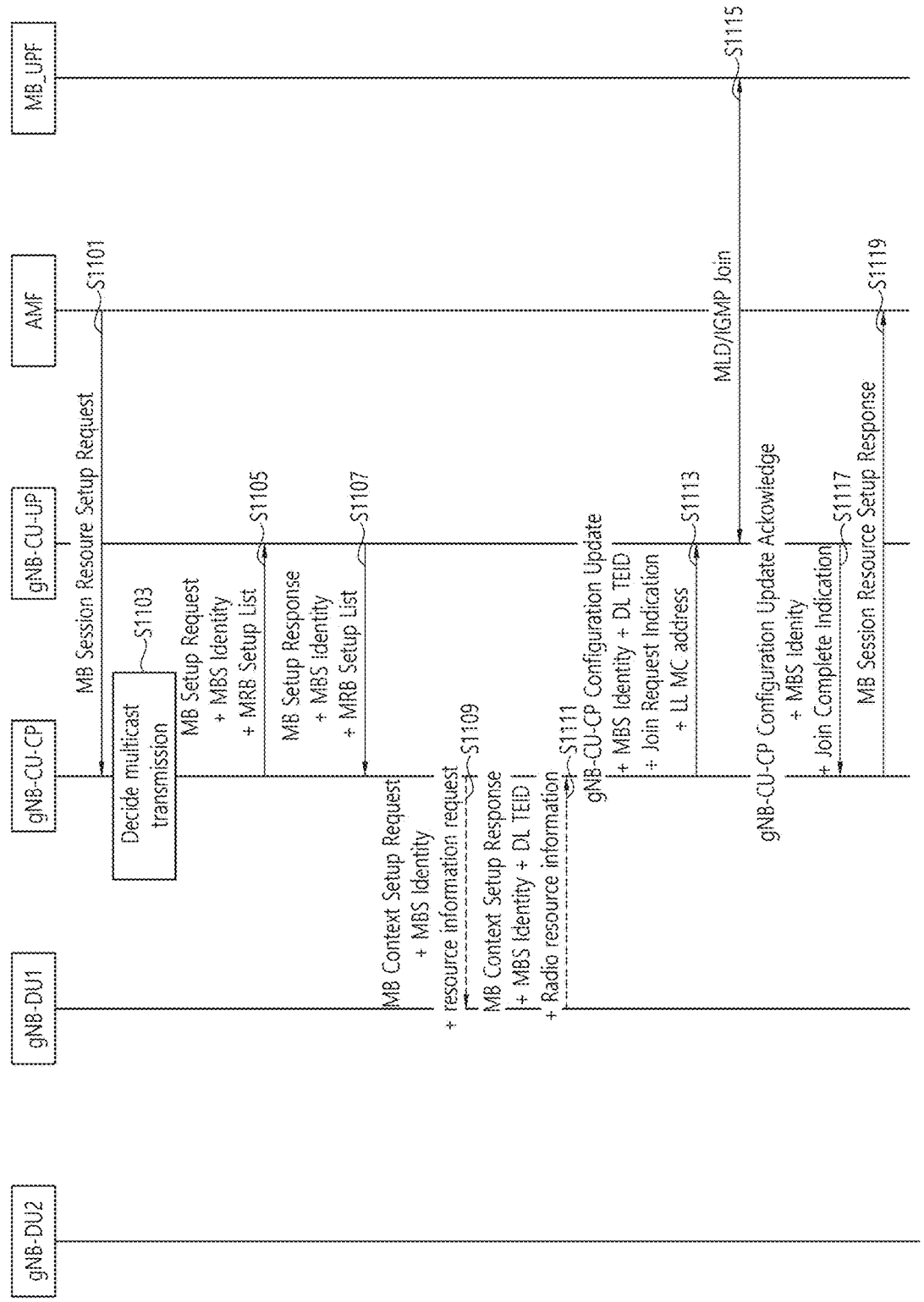
FIG. 11 shows a third example of a resource allocation procedure for MBs according to an embodiment of the present disclosure.

FIG. 11 shows a third example of a resource allocation procedure for MBs according to an embodiment of the present disclosure. In FIG. 11, DU may take a role for determining resources for a multicast or broadcast transmission of the MBS service.

Referring to FIG. 11, in step S1101, the AMF may send an MB Session Resource Setup Request message or new message including the MBS Identity (e.g., TMGI), low layer multicast (LL MC) address, and/or 5G Authorized QoS Profile to the gNBCU-CP where CM CONNECTED UEs that has joined the TMGI resides.

In step S1103, on receiving the MB Session Resource Setup Request message from the AMF, the gNB-CU-CP may create an MB session context for the received MBS Identity. Based on the number of UEs that are in RRC_CONNECTED and a location of the UEs, the gNB-CU-CP may decide to perform multicast or broadcast transmission for indicated MBS, which may cover one or more DUs. The UEs may comprise UEs that have joined the MBS service, and/or UEs that are in cells covered by the one or more DUs. The gNB-CU-CP may receive information for the location of UEs from at least one of a CN, an application server or the UEs. The gNB-CU-CP may receive information for the number of UEs that are RRC_CONNECTED from at least one of a CN, an application server or the UEs. The CU (e.g., CU-CP) may also decide a Multicast Radio Bearer (MRB) ID and/or MRB QoS.

In step S1105, the gNB-CU-CP may send a Bearer Context Modification Request, a MB setup request message or new message to the gNB-CU-UP to request establishing the MBS bearer for multicast/broadcast data transmission between the gNB-CU-UP and the gNB-DU. The Bearer Context Modification Request or the MB setup request message may include the MBS Identity to indicate MBS to which the requested MBS bearer is related.

In step S1107, upon a receipt of the Bearer Context Modification Request or the MB setup request message, the gNB-CU-UP may establish the requested MBS bearer for indicated MBS and transmit a Bearer Context Modification Response message, MB setup response message or new message to the gNB-CU-CP.

In step S1109, on receiving the Bearer Context Modification Response message or the MB setup response message from the gNB-CU-UP, the gNB-CU-CP may send a UE Context Setup/Modification Request message, MB context setup request message or new MBS message to the gNB-DU in order to request the radio resources for the MBS service. The following information should be included in the UE Context Setup/Modification Request message or the MB context setup request message:
  Multicast Radio Bearer (MRB) ID, MRB QoS; and/or
  MBS area ID.

In step S1111, when DU receives the information included in the UE Context Setup/Modification Request message or the MB context setup request message, the gNB-DU will allocate the radio resources for the MBS service and give a UE Context Setup/Modification response message or a MB context setup Response message (or new message) including the DL TEID and/or MBS ID to the gNB-CU-CP. The following information may be included in the UE Context Setup/Modification response message or the MB context setup Response message:
  Multicast Radio Bearer (MRB) ID, MRB QoS;
  PMCH configuration including allocated subframes, modulation and coding scheme, MCH scheduling period;
  Logical channel ID;
  MBSFN subframe configuration including radio frame allocation period, radio frame allocation offset, subframe allocation;
  common subframe period; and/or
  MBS area ID.

In step S1113, upon the receipt of the UE Context Setup/Modification Response message or the MB context setup response message from the gNB-DU, the gNBCU-CP may transmit a Bearer Context Modification Request message, gNB-CU-CP configuration update message or new message to the gNB-CU-UP. The Bearer Context Modification Request message or the gNB-CU-CP configuration update message may contain the MBS Identity to indicate MBS to which the requested bearer is related. The Bearer Context Modification Request message or the gNB-CU-CP configuration update message may include the Join Request Indication and/or the LL MC address so that the gNB-CU-UP can join the multicast group for indicated MBS.

In step S1115, on receiving the Bearer Context Modification Request message or the gNB-CU-CP configuration update message from the gNB-CU-CP, the gNB-CU-UP may perform a multicast listener discover (MLD)/internet group management protocol (IGMP) Join for the MBS indicated by the MBS Identity along with a MB-UPF. If the gNB-CU-UP receives multiple Bearer Context Modification Request messages including the Join Request Indication and/or the LL MC address, the gNB-CU-UP may perform the MLD/IGMP Join once.

In step S1117, the gNB-CU-UP may respond with a Bearer Context Modification Response message, gNB-CU-CP configuration update acknowledge (ACK) message or new message. The Bearer Context Modification Response message or gNB-CU-CP configuration update ACK message may include the Join Complete Indication to inform the gNB-CU-CP that joining the multicast group for the MBS is completed.

In step S1119, when the Bearer Context Modification Response message or gNBCU-CP configuration update ACK message is received from the gNB-CU-UP, the gNB-CU-CP may transmit a DL RRC Message Transfer message with the RRCReconfiguration to the gNB-DU in order to provide the UE with the information related to bearer established for the MBS.

Hereinafter, an apparatus for a CU in a wireless communication system, according to some embodiments of the present disclosure, will be described.

For example, the CU may include at least one processor, a transceiver, and a memory.

For example, the at least one processor may be configured to be coupled operably with the memory and the transceiver.

The at least one processor may be configured to control the transceiver to receive, from one or more DUs, resource information on radio resources for a multicast-broadcast service (MBS) service allocated by the one or more DUs. The at least one processor may be configured to determine to perform a multicast or broadcast transmission of the MBS service to wireless devices based on a location of the wireless devices and a number of the wireless devices. In another case, the at least one processor may be configured to determine to perform a unicast transmission of the MBS service to wireless devices based on a location of the wireless devices and a number of the wireless devices. That is, the at least one processor may be configured to determine whether to perform a MBS transmission of the MBS service or a unicast transmission of the MBS service to wireless devices based on a location of the wireless devices and a number of the wireless devices. The at least one processor may be configured to determine common resources for the multicast or broadcast transmission of the MBS service to be used by the one or more DUs based on the resource information received from the one or more of DUs. The common resources may comprise resources that are common among the radio resources for the MBS service allocated by the one or more DUs. The at least one processor may be configured to control the transceiver to transmit, to the one or more DUs, information for the common resources for the multicast or broadcast transmission of the MBS service.

The common resources may be determined/selected so that the multicast or broadcast transmission does not interfere with sessions that are on-going in DUs other than the one or more DUs.

The at least one processor may be configured to control the transceiver to transmit, to the one or more DUs, a message for requesting the resource information on radio resources for MBS service allocated by the one or more DUs. The resource information may be received in response to the message.

The wireless devices may comprise at least one of: wireless devices that are in a radio resource control (RRC) connected mode; wireless devices that have joined the MBS service; or wireless devices that are in cells covered by the one or more DUs.

The at least one processor may be configured to control the transceiver to receive, from at least one of a core network (CN), an application server or the wireless devices, information for the location of the wireless devices. The at least one processor may be configured to control the transceiver to receive, from at least one of a CN, an application server or the wireless devices, information for the number of the wireless devices.

The at least one processor may be configured to control the transceiver to receive, from an AMF, a request message for a setup of a MBS bearer session resource. The at least one processor may be configured to determine to perform the multicast or broadcast transmission of the MBS service comprises determining to perform the multicast or broadcast transmission of the MBS service upon receiving the request message.

The common resources may comprise at least one of: a MRB ID related to the MBS service; an MRB QoS related to the MBS service; a PMCH configuration including at least one of allocated subframes, modulation and condign scheme (MCS) or multicast channel (MCH) scheduling period; a logical channel ID; a MBSFN subframe configuration including at least one of a radio frame allocation period, a radio frame allocation offset or a subframe allocation; a command subframe period; or an MBS area ID related to the MBS service.

The CU may comprise CU-CP. The CU-CP may transmit, to a CU-UP, a bearer setup request message for requesting an establishment of an MBS bearer for the multicast or broadcast transmission. The CU-CP may receive, from the CU-UP, a bearer setup response message after the MBS bearer is established between the CU-UP and the one or more DUs. The CU-CP may transmit, to the one or more DUs, the information for the common resources upon receiving the bearer setup response message.

The at least one processor may be configured to control the transceiver to receive, from the one or more DUs, a response message for the information for the common resources. The response message may comprise at least one of a DL TEID or an MBS ID.

Hereinafter, an apparatus for a wireless device in a wireless communication system, according to some embodiments of the present disclosure, will be described.

For example, the wireless device may include at least one processor, a transceiver, and a memory.

For example, the at least one processor may be configured to be coupled operably with the memory and the transceiver.

The at least one processor may be configured to identify common resources for a multicast or broadcast transmission of a MBS service. The common resources may comprise resources that are common among radio resources for the MBS service allocated by one or more DUs. The at least one processor may be configured to control the transceiver to receive, from the one or more DUs, the multicast or broadcast transmission of the MBS service through the common resources. It may be determined to perform the multicast or broadcast transmission of the MBS service is determined based on a location of wireless devices and a number of the wireless devices. The wireless devices may comprise at least one of: wireless devices that are in a radio resource control (RRC) connected mode; wireless devices that have joined the MBS service; or wireless devices that are in cells covered by the one or more DUs.

Hereinafter, a processor for a CU in a wireless communication system, according to some embodiments of the present disclosure, will be described.

The processor may be configured to receive, from one or more DUs, resource information on radio resources for a multicast-broadcast service (MBS) service allocated by the one or more DUs. The processor may be configured to determine to perform a multicast or broadcast transmission of the MBS service to wireless devices based on a location of the wireless devices and a number of the wireless devices. The processor may be configured to determine common resources for the multicast or broadcast transmission of the MBS service to be used by the one or more DUs based on the resource information received from the one or more of DUs. The processor may be configured to transmit, to the one or more DUs, information for the common resources for the multicast or broadcast transmission of the MBS service.

Hereinafter, a non-transitory computer-readable medium has stored thereon a plurality of instructions for a CU in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a base station.

The stored a plurality of instructions may cause the CU to: receive, from one or more DUs, resource information on radio resources for a multicast-broadcast service (MBS) service allocated by the one or more DUs; determine to perform a multicast or broadcast transmission of the MBS service to wireless devices based on a location of the wireless devices and a number of the wireless devices; determine common resources for the multicast or broadcast transmission of the MBS service to be used by the one or more DUs based on the resource information received from the one or more of DUs; and transmit, to the one or more DUs, information for the common resources for the multicast or broadcast transmission of the MBS service.

The present disclosure may have various advantageous effects.

For example, CU can coordinate resources for MBS service which covers multiple DUs so that multicast or broadcast transmission of the MBS service can avoid interferences with other on-going sessions.

For another example, DU may determine the resources for the MBS service by itself. DU may determine the resources for the MBS service by itself if one DU is involved for the MBS service.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

Other implementations are within the scope of the following claims.

The invention claimed is:

1. A method performed by a central unit in a wireless communication system, the method comprising:
    receiving, from multiple distributed units, resource information for radio resources related to a multicast-broadcast service allocated by the multiple distributed units, wherein the radio resources comprise a corresponding radio resource allocated by each of the multiple distributed units;
    determining a transmission scheme of the multicast broadcast service for wireless devices as a multicast or broadcast transmission, based on a location of the wireless devices and a number of the wireless devices;
    determining common resources for the multicast or broadcast transmission of the multicast-broadcast service to be used by the multiple distributed units, based on the radio resources allocated by the multiple distributed units; and
    transmitting, to the multiple distributed units, information for the common resources for the multicast or broadcast transmission of the multicast-broadcast service.

2. The method of claim 1, wherein the common resources are determined so that the multicast or broadcast transmission does not interfere with sessions that are on-going in distributed units other than the multiple distributed units.

3. The method of claim 1, further comprising determining the transmission scheme of the multicast-broadcast service as a unicast transmission, based on a location of the wireless devices and a number of the wireless devices.

4. The method of claim 1, further comprising:
    transmitting, to the multiple distributed units, a message for requesting the resource information for the radio resources related to the multicast-broadcast service allocated by the multiple distributed units,
    wherein the resource information is received in response to the message.

5. The method of claim 1, wherein the wireless devices comprise at least one of:
    wireless devices that are in a radio resource control (RRC) connected mode;
    wireless devices that have joined the multicast-broadcast service; or
    wireless devices that are in cells covered by the multiple distributed units.

6. The method of claim 1, further comprising:
    receiving, from at least one of a core network, an application server or the wireless devices, information for the location of the wireless devices.

7. The method of claim 1, further comprising:
    receiving, from at least one of a core network, an application server or the wireless devices, information for the number of the wireless devices.

8. The method of claim 1, further comprising:
    receiving, from an access and mobility management function (AMF), a request message for a setup of a multicast-broadcast service bearer session resource,
    wherein the determining of the transmission scheme comprises determining the transmission scheme of the multicast-broadcast service as the multicast or broadcast transmission upon receiving the request message.

9. The method of claim 1, wherein the common resources comprise at least one of:
    a multicast radio bearer (MRB) identity (ID) related to the multicast-broadcast service;
    an MRB quality of service (QOS) related to the multicast-broadcast service;
    a physical multicast channel (PMCH) configuration including at least one of allocated subframes, modulation and condign scheme (MCS) or multicast channel (MCH) scheduling period;
    a logical channel ID;
    a multicast broadcast single frequency network (MBSFN) subframe configuration including at least one of a radio frame allocation period, a radio frame allocation offset or a subframe allocation;
    a command subframe period; or
    an multicast-broadcast service area ID related to the multicast-broadcast service.

10. The method of claim 1, wherein the central unit comprises a central unit-control plane (CU-CP).

11. The method of claim 10, wherein the CU-CP transmits, to a central unit-user plane (CU-UP), a bearer setup request message for requesting an establishment of an multicast-broadcast service bearer for the multicast or broadcast transmission, wherein the CU-CP receives, from the CU-UP, a bearer setup response message after the multicast-broadcast service bearer is established between the CU-UP and the multiple distributed units, and wherein the CU-CP transmits, to the multiple distributed units, the information for the common resources upon receiving the bearer setup response message.

12. The method of claim 1, receiving, from the multiple distributed units, a response message for the information for the common resources, wherein the response message comprises at least one of a downlink tunnel endpoint identifier (TEID) or an multicast-broadcast service ID.

13. The method of claim 1, wherein the wireless devices are in communication with at least one of a user equipment, a network, or autonomous vehicles other than the wireless devices.

14. A central unit (central unit) in a wireless communication system, comprising:

a transceiver;

a memory; and at least one processor operatively coupled to the transceiver and the memory, wherein the memory stores instructions that, based on being executed by the at least one processor, perform operations comprising:

receiving, from multiple distributed units, resource information for radio resources related to a multicast-broadcast service allocated by the multiple distributed units, wherein the radio resources comprise a corresponding radio resource allocated by each of the multiple distributed units;

determining a transmission scheme of the multicast broadcast service for wireless devices as a multicast or broadcast transmission, based on a location of the wireless devices and a number of the wireless devices;

determining common resources for the multicast or broadcast transmission of the multicast-broadcast service to be used by the multiple distributed units, based on the radio resources allocated by the multiple distributed units; and transmitting, to the multiple distributed units, information for the common resources for the multicast or broadcast transmission of the multicast-broadcast service.

15. A wireless device in a wireless communication system comprising:

a transceiver;

a memory; and at least one processor operatively coupled to the transceiver and the memory, wherein the memory stores instructions that, based on being executed by the at least one processor, perform operations comprising:

obtaining information for common resources for a multicast or broadcast transmission of a multicast-broadcast service, wherein the common resources are used by multiple distributed units and are determined based on radio resources related to the multicast-broadcast service allocated by the multiple distributed units, and wherein the radio resources comprise a corresponding radio resource allocated by each of the multiple distributed units; and receiving, from the multiple distributed units, the multicast or broadcast transmission of the multicast-broadcast service through the common resources, wherein a transmission scheme of the multicast-broadcast service for wireless devices is determined as the multicast or broadcast transmission based on a location of the wireless devices and a number of the wireless devices.

\* \* \* \* \*